United States Patent [19]

Jyrek

[11] Patent Number: 5,233,841
[45] Date of Patent: Aug. 10, 1993

[54] METHOD OF OPTIMISING THE PERFORMANCE OF REFRIGERANT VAPORIZERS INCLUDING IMPROVED FROST CONTROL METHOD AND APPARATUS

[75] Inventor: Paul Jyrek, Eurasburg, Fed. Rep. of Germany

[73] Assignee: Küba Kältetechnik GmbH, Baierbrunn, Fed. Rep. of Germany

[21] Appl. No.: 723,494

[22] Filed: Jun. 28, 1991

Related U.S. Application Data

[63] Continuation-in-part of Ser. No. 463,023, Jan. 10, 1990, abandoned.

[51] Int. Cl.$^5$ .............................................. F25D 21/00
[52] U.S. Cl. .......................................... 62/80; 62/211; 62/223
[58] Field of Search ................. 62/223, 225, 211, 212

[56] References Cited

U.S. PATENT DOCUMENTS 4,621,502  11/1986  Ibrahim et al. ...................... 62/223
4,685,309   8/1987  Behr ................................. 62/223 X
4,745,767   5/1988  Ohya et al. ........................ 62/212 X Primary Examiner—William E. Wayner
Attorney, Agent, or Firm—Townsend and Townsend Khourie and Crew

[57] ABSTRACT

A method is described for the performance optimization of refrigeration devices fed with refrigerant, in particular of air refrigeration devices in which a setting value is formed for an electrically or electronically operatable expansion valve in dependence on different temperature measurements continually ensures the ideal filling of the vaporizer. The invention includes a method of optimising the performance of a fan air refrigerator and of determining the ideal timepoint for defrosting is described, with the time for defrosting being determined by a comparative monitoring of a temperature difference, on the one hand, and a time related monitoring of the refrigerant throughflow, on the other hand. In addition the cold room temperature is regulated by the supply air sensor by switching on and switching off the compressor.

31 Claims, 2 Drawing Sheets

METHOD OF OPTIMISING THE PERFORMANCE OF REFRIGERANT VAPORIZERS INCLUDING IMPROVED FROST CONTROL METHOD AND APPARATUS

CROSS-REFERENCE TO RELATED APPLICATIONS

This application is a continuation in part of U.S. Pat. No. 07/463,023, filed 01/10/90, now abandoned, hereby expressly incorporated by reference for all purposes.

The invention relates to a method and to an apparatus of optimising the performance of refrigeration devices which are operated with a refrigerant and are fed via an expansion valve, in particular the performance of fan air refrigerators, in which, in addition to the air entry temperature or the supply air temperature (tL 1), both the vaporization temperature ($t_O$) and also the temperature at the air refrigerator outlet (tOh) are measured continuously or periodically and the difference value ($\delta t_l$) between the supply air temperature (tL 1) and the vaporization temperature ($t_O$) is determined; in which this difference value (At,) is multiplied by a factor between 0.6 and 0.7, in particular by the factor 0.625, and the computed temperature value which is obtained is compared with the difference value ($\delta t_{oh}$) of the temperature at the air refrigerator outlet ($t_{oh}$) and the vaporization temperature ($t_o$); and in which the expansion valve (EV) at the inlet side of the air refrigerator is then controlled continuously or periodically in dependence on the result of the comparison in such a way that the temperature at tho vaporizer outlet ($t_{oh}$) is at least substantially the same as the computed temperature value.

It is also an object of the present invention to improve a process of this kind, with simultaneous minimisation of the technical cost and complexity that is required, in such a way that a recognition of the ideal time point for defrosting is possible and in such a way that the operation of the refrigerators fed with refrigerants, in particular of fan air refrigerators, is further improved.

Refrigerant vaporizers, in particular fan air refrigeration devices are used on a large scale in practice and must ensure that the materials to be cooled, in particular also particularly sensitive materials which may not dry out, are kept at a temperature which can be predetermined as accurately as possible.

Satisfying this requirement leads to considerable difficulties, in particular when different performance requirements arise, when the air supply temperature is subjected to larger fluctuations, for example on the opening of doors, and when frost or ice formation of differing degree occurs in the air refrigeration device itself.

An object underlying the invention is to provide a method for optimizing the performance of such refrigerant vaporizers which can be realized with little complexity and which always ensures the best possible performance of the air refrigerator and also contributes to a more uniform icing up and thus to a simplification and improvement of the defrosting control.

This object is satisfied in accordance with the invention essentially in that in addition to the air entry temperature or the supply air temperature both the vaporization temperature $t_0$ and also the temperature at the air refrigerator outlet $t_{oh}$ are measured continuously or periodically and the difference value $\Delta t_1$ measured in degrees Kelvin between the supply air temperature tLl and the vaporization temperature $t_0$ is determined; that this difference value $\Delta t_1$ is multiplied by a factor between 0.6 and 0.7, in particular by the factor 0.625 and the computed temperature value which is obtained is compared with a difference value $\Delta t_2$ between the temperature $t_{0H}$ at the air refrigerator outlet and the vaporization temperature $t_0$; and that the expansion valve EV at the inlet side of the air refrigerator is then controlled continuously or periodically in dependence on the result of the comparison in such a way that the difference temperature measured at the vaporizer outlet $\Delta t_2$ is at least substantially the same as the computed temperature value.

The practically continuous determination of the computed temperature value provided in accordance with the invention and the control of the expansion valve in such a way that the vaporizer outlet temperature $\Delta t_2$ follows the computed temperature value as accurately as possible ensures that in the last part section of the vaporizer the refrigerant is always present in the overheated state and that only vapor emerges at the outlet side, and indeed practically independently of the prevailing performance requirements. Thus a very precise temperature control is made possible in the respective refrigerated space or refrigeration chamber and this has a positive effect, in particular with sensitive materials.

A further consequence of the inventive performance optimization of the air refrigerator is that the servicing requirements are lower and that a more uniform icing up takes place as a result of the continuous control which in turn makes it possible to optimize the carrying out of the defrosting procedures.

Although it would in principle also be possible to detect the vaporization temperature at the output side via the pressure, this temperature detection is preferably affected in accordance with the invention via a temperature sensor which is directly secured to the vaporizer tube since the formation of the measurement value is then made completely independent of the particular refrigerant which is used. The mounting location for the temperature sensor is relatively uncritical, the corresponding sensor is however preferably installed at approximately the half length of the vaporizer tube. The formation of frost or ice on the vaporizer tube does not lead to a falsification of the measured value.

Although different controllable expansion valves can in principle be used use is preferably made of an electrically or electronically positionable, preferably digitally controllable valve which is equipped with a needle valve. As the entire processing of the measured value and the formation of the regulating signal takes place in a computing unit the control signals which are respectively formed can be processed by a valve of this kind in a particularly favourable manner while avoiding regulation instability.

The frost control object is satisfied in accordance with the invention essentially in that the difference value ($\delta t_l$) between the supply air temperature (tL 1) and the vaporization temperature ($t_O$) is monitored for the purpose of determining the ideal defrosting time point of the refrigeration device with respect to exceeding a predeterminable boundary value; in that, in the case of exceeding this boundary value, the compressor and fan are switched off and a defrosting heating device is switched on until the air refrigerator has reached a predeterminable temperature corresponding to the ice-free state; and in that the compressor is then switched on again and also the fan with a time delay relative to the compressor.

In this way it is possible to additionally exploit the data already obtained for the purpose of performance optimisation, namely the values of the supply air temperature and of the vaporization temperature, in order to obtain a defrost signal, in conjunction with a boundary value comparison which can be carried out simply in the computing unit, with the defrost signal, on the one hand, bringing about the switching on of a heating system and, on the other hand, the switching off of the compressor and of the fan. A stop signal for the termination of the heating is preferably obtained via a temperature sensor which is arranged in the air refrigerator by means of which the ice-free state of the air refrigerator can be determined. If the stop signal for the termination of the heating is present then a renewed switching in of the compressor takes place, but not however a switching in of the fan, because otherwise warm air would be blown out into the room. The switching in of the fan is preferably effected in dependence on the vaporization temperature, that is to say this temperature value can also be multiply exploited in the context of the present invention. The switching in of the fan then takes place when the vaporization temperature has reached a preset low value.

In accordance with a further embodiment of the invention the switching in of the fan is effected in dependence on the vaporization temperature and the temperature of the temperature sensor ($t_{STB}$). The switching in of the fan takes place in this case when the vaporization temperature and that of the temperature sensor ($t_{STB}$) has reached a value which is computed in dependence on the selected room air temperature.

A particular advantageous embodiment of the method of the invention is characterized in that, in parallel with the monitoring of the difference temperature ($\delta t_l$), a monitoring of the refrigerant throughflow is effected with respect to a throughflow reduction which extends over a predeterminable time interval, and in that the switching in of the defrost heating device takes place in dependence on both criteria.

This preferably used variant of the method of the invention in characterized by a particularly reliable manner of operation even with difficult operating conditions, in particular with frequent new loading of the cold room or with frequent opening of the cold room doors since disturbing affects brought about by such procedures can be largely precluded. It in important in this respect that the time factor is taken into account in conjunction with the determination of the refrigerant throughflow, and thus through the parallel consideration of the temperature difference and of the throughflow change of the refrigerant, and that through linking the results of this parallel monitoring disturbing influences can be practically completely precluded.

In accordance with a further advantageous layout of the invention the air supply temperature is used as a room thermostat function for the control of the compressor or of the compressors. The signal delivered by the sensor which determines the air supply temperature is additionally exploited for this in the computing unit in such a way that it is compared with a predeterminable desired value and, on exceeding or falling short of a threshold range related to the desired value, which corresponds to a switching hysteresis of a room thermostat, a switching signal is generated for switching off or switching in the compressor. This room thermostat function is out of operation during the defrosting operation. It is of particular advantage, in conjunction with this realised room thermostat function, that an expensive room thermostat which would otherwise be necessary can be spared, and that very small switching hysteresis values can also be preset, which has a very favourable affect on the quality of the products stored in the respective cold room.

Particularly advantageous variants of the invention are set forth in the subordinate claims.

DESCRIPTION OF THE PREFERRED EMBODIMENT

Figure 1:
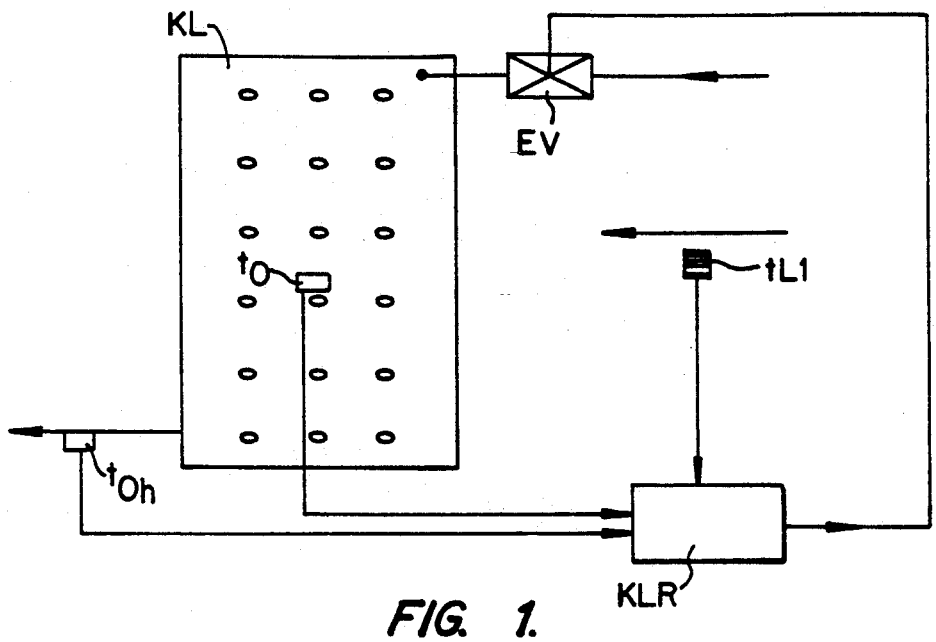
FIG. 1 is a schematic representation of a fan air refrigeration device which is operated with a refrigerant and which is equipped with a control unit which operates in accordance with the method of the invention.

The invention will be explained in the following with reference to an embodiment and to the drawing, the single figure of which shows a schematic representation of a fan air refrigeration device which is operated with a refrigerant and which is equipped with a control unit which operates in accordance with the method of the invention.

FIG. 1 shows a fan air refrigeration device KL, the tube conduits of which pass through a pack of lamella and are fed with refrigerant via an expansion valve EV. In the air cooler KL a temperature sensor is arranged in direct contact with the tube conduits at approximately the half tube length of one distribution and the vaporization temperature $t_0$ is measured by means of this temperature sensor. The measurement signal is supplied to a computing unit KLR.

The temperature $t_{0H}$ is likewise measured at the vaporizer outlet by means of a temperature sensor and the measured values are likewise supplied to the computing unit KLR.

The temperature tLI of the supply air is measured by means of a temperature sensor arranged in the flow of supply air and the computing unit KLR also receives these measured values.

The supply of refrigerant takes place via a controllable expansion valve EV and the setting value is delivered by the computing unit KLR.

In the computing unit KLR, in the illustrated embodiment, the difference $\Delta t_1$ measured in degrees Kelvin is formed between the supply air temperature tL1 and the vaporization temperature $t_0$ and this difference value is multiplied by a predeterminable factor between 0.6 and 0.7.

The computed temperature value which is obtained is then compared with the difference temperature $t_{0H} - t_0$ ($\Delta t_2$), at the outlet of the vaporizer and when deviations arise a control or regulating signal is formed for the expansion valve EV which leads to an adjustment of the valve such that a temperature value $t_{0H}$ arises at the outlet of the vaporizer which provides $\Delta t_2$ as close as possible to the prevailing computed temperature value.

Figure 2:
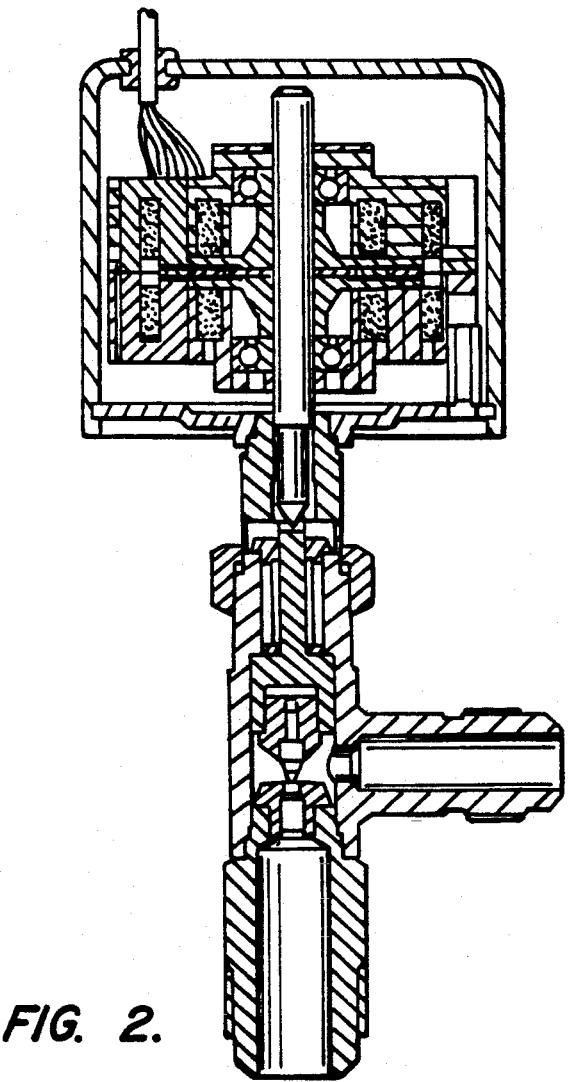
FIG. 2 is a needle valve having a step motor.

FIG. 2 is a needle valve having a step motor operable as a controllable expansion valve which is electrically or electronically positionable.

Figure 3:
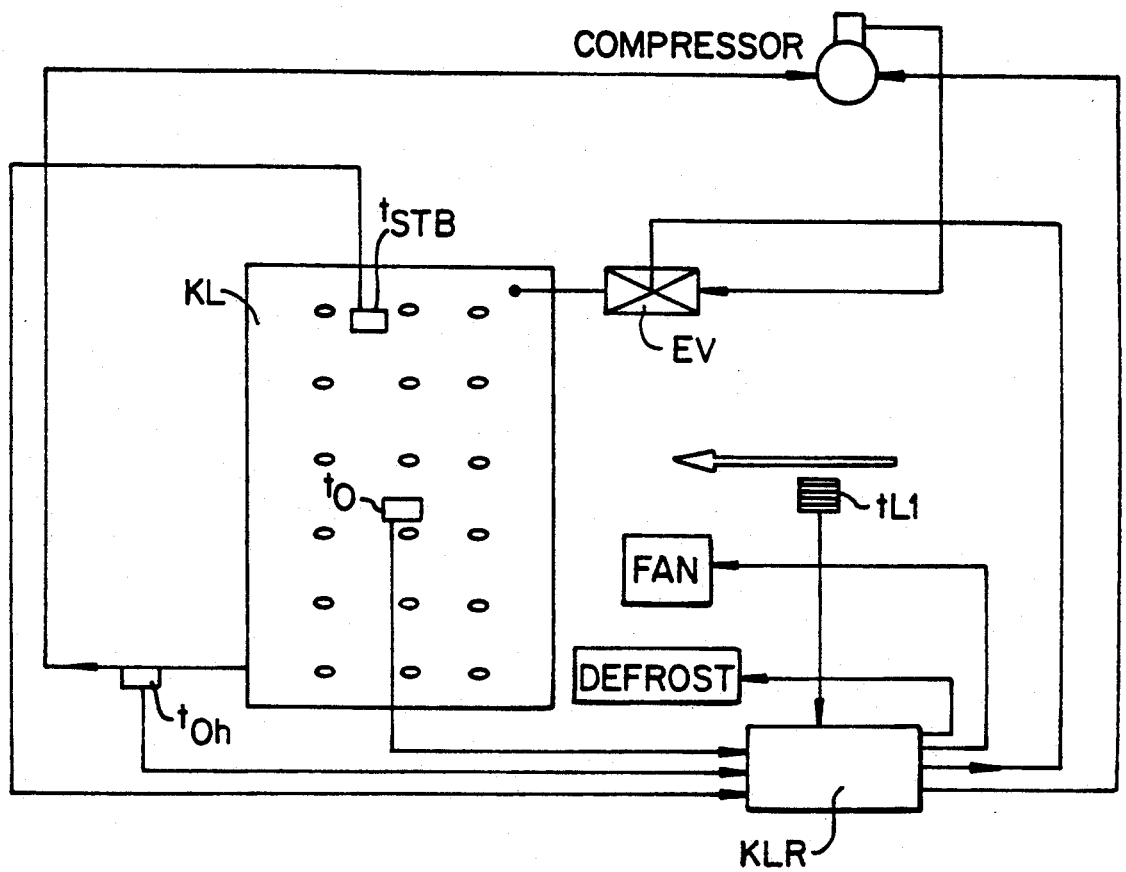
FIG. 3 shows a fan air refrigerator which is equipped with the measurement, regulation and control units necessary to carry out the method of the invention.

FIG. 3 shows a fan air refrigerator which equipped with the measurement, regulation and control units necessary to carry out the method of the invention. A fan air refrigerator KL, the tube conduits of which are led through a pack of fins and are charged with refrigerant via an expansion valve EV is flowed through by an airflow in the direction of the arrow that is shown, with this airflow being generated by means of a non-illustrated fan.

A temperature sensor is provided in the air refrigerator KL in direct contact with the tubular conduit at approximately half the tube length of a manifold or of a conduit, and the vaporization temperature $t_O$ is measured by means of this temperature sensor. The measurement signal is supplied to a computing unit KLR.

The temperature $t_{Oh}$ is measured at the vaporizer outlet, likewise by means of a temperature sensor, and the measured values are likewise supplied to the computing unit KLR.

The temperature tL I of the supply air is measured by means of a temperature sensor arranged in the supply airflow and the computing unit KLR also receives these measured values. A further temperature sensor is arranged in the upper region of the air refrigerator KL and delivers a temperature restriction signal $t_{STB}$ when a defrost heating system is in operation and must be switched off to attain a specific air refrigerator temperature. This temperature signal $t_{STB}$ is likewise supplied to the computing unit KLR.

A needle valve or ball valve actuatable by a stepping motor is preferably used as the expansion valve EV because the degree of opening or closing of the valve can be very precisely determined in simple manner by an appropriate counting of steps.

In addition to the initially already quoted performance optimisation it is also possible with this arrangement to determine the ideal timepoint for defrosting in the best possible manner and indeed even when disturbances are present in the operation of the refrigeration system in the form of new loading procedures or repeated opening of cold room doors.

Through the monitoring of the temperature difference between the supply air temperature tL 1 and the vaporization temperature $t_O$ it is possible to obtain a signal which characterizes icing up since the exceeding of a specific temperature difference means that ice or hoar-frost has formed to a considerable degree on the surface of the air refrigerator, and that the desired temperature exchange between the refrigerant and the air which is flowing through it can no longer take place.

This characterizing signal on its own is not generally sufficient to prevent the effects of disturbances which occur in practice.

For this reason the refrigerant throughflow is additionally monitored and an examination is made as to whether the expansion valve reduce the throughflow over a predeterminable longer period of time, since this manner of functioning of the expansion valve is an indication that icing up has occurred in the vaporizer.

In the computing unit KLR the manner of operation of the expansion valve EV, i.e. the closing and opening processes of this expansion valve EV in (are) monitored, and indeed while taking account of the time factor.

Through an AND-linking of the two parallel monitoring processes it is ensured that the ideal timepoint for the necessary start of a defrosting process can always be determined independently of disturbing parameters.

The total efficiency of the respective refrigeration system is hereby substantially improved, in particular in conjunction with the performance optimisation which is achieved with essentially the same technical means.

What is claimed is:

1. A method of optimizing performance of a refrigeration device operated with a refrigerant and fed via an expansion valve, characterized in that:
    in addition to a supply air temperature, both a vaporization temperature and an air cooler outlet temperature at an outlet tube are measured and a first temperature difference value measured between said supply air temperature and said vaporization temperature is determined;
    said difference value is multiplied by a factor to provide a computed temperature value and said computed temperature value which is obtained is compared with a second temperature difference value measured between said air cooler outlet temperature at an outlet tube and said vaporization temperature to provide a comparison value; and
    the expansion valve at an inlet side of the refrigerator device is controlled responsive to said comparison value in such a way that said air cooler outlet temperature provides said second temperature difference value at least substantially the same as said computed temperature value.

2. The optimizing method in accordance with claim 1, characterized in that said vaporization temperature is measured by means of a temperature sensor coupled to a vaporizer tube.

3. The optimizing method in accordance with claim 1, characterized in that said first and second temperature difference values, said computed value and said comparison value are continuously formed and said expansion valve is periodically controlled.

4. The optimizing method in accordance with claim 1, characterized in that the control of the expansion valve (EV) is always effected when said comparison value lies outside of a predetermined tolerance range.

5. The optimizing method in accordance with claim 1, characterized in that during a phase of commencing use of the refrigerator device a periodic control used for control of the expansion valve differs from a periodic control used in normal operation.

6. The optimizing method in accordance with claim 1, characterized in that the expansion valve is positionable and includes an adjustable valve needle.

7. The optimizing method in accordance with claim 1, characterized in that a processing of said measured values and a formation of control signals for the expansion valve takes place in a computing unit which is provided with a specially prepared program.

8. The optimizing method of claim 1 wherein said vaporization temperature and said cooler outlet temperature measuring step is performed continuously.

9. The optimizing method of claim 1 wherein said vaporization temperature and said cooler outlet temperature measuring step is performed periodically.

10. The optimizing method of claim 1 wherein said difference measuring step measures said difference in degrees Kelvin.

11. The optimizing method of claim 10 wherein said factor is between about 0.6 and 0.7.

12. The optimizing method of claim 11 wherein said factor is about 0.625.

13. The optimizing method of claim 1 wherein said temperature comparing step is performed continuously.

14. The optimizing method of claim 1 wherein said temperature comparing step is performed periodically.

15. The optimizing method of claim 2 wherein said temperature sensor is coupled to said vaporizer tube about in a region one-half a length of said vaporizer tube.

16. The optimizing method of claim 6 wherein said positionable expansion valve is electrically positionable.

17. The optimizing method of claim 16 wherein said electrically positionable expansion valve is digitally controllable.

18. A method of operating a refrigeration device, comprising the steps of:
   determining a first difference temperature between an air supply temperature and a vaporization temperature;
   multiplying said first difference temperature by a predetermined factor to provide a computed temperature;
   determining a second difference temperature between an air cooler outlet temperature at an outlet tube and said vaporization temperature;
   comparing said computed temperature with said second difference temperature; and
   controlling an expansion valve of the refrigeration device to provide said second difference temperature at least about equal to said computed temperature.

19. The operating method of claim 18 wherein said difference determining step determines said difference between said air supply temperature and said vaporization temperature in degrees Kelvin and said predetermined factor is between about 0.6 and 0.7.

20. The operating method of claim 19 wherein said predetermined factor is about 0.625.

21. A refrigerator, comprising:
   means for measuring a first temperature difference between and air inlet temperature of a refrigerator and a vaporization temperature of a refrigerant of said refrigerator;
   means, coupled to said first temperature measuring means, for computing a temperature value from said first temperature difference by multiplying said first temperature difference by a predetermined factor;
   means for measuring a second temperature difference between a vaporizer outlet temperature and said vaporization temperature; and
   means, coupled to said second temperature difference measuring means and to said computing means, for controlling a temperature of said refrigerant such that said second temperature difference approximately equals said computed temperature difference.

22. Method of optimising the performance of refrigeration devices which are operated with a refrigerant and are fed via an expansion valve, in particular the performance of fan air refrigerators, in which, in addition to the air entry temperature or the supply air temperature (tL 1), both the vaporization temperature ($t_O$) and also the temperature at the air refrigerator outlet ($t_{Oh}$) are measured continuously or periodically and the difference value ($\delta t_l$) between the supply air temperature (tL 1) and the vaporization temperature ($t_O$) is determined, in which this difference value ($\delta t_1$) is multiplied by a factor between 0.6 and 0.7, and the computed temperature value which is obtained is compared with the difference value ($\delta t_{oh}$) of the temperature at the air refrigerator outlet ($t_{oh}$), and the vaporization temperature ($t_o$), and in which the expansion valve (EV) at the inlet side of the air refrigerator is then controlled continuously or periodically in dependence on the result of the comparison in such a way that the temperature at the vaporizer outlet ($t_{oh}$) is at least substantially the same as the computed temperature value, characterized in that the difference value ($\delta t_1$) between the supply air temperature (tL 1) and the vaporization temperature ($t_O$) is monitored for the purpose of determining the ideal defrosting time point of the refrigeration device with respect to exceeding a predeterminable boundary value; in that, in the case of exceeding this boundary value, a compressor and fan are switched off and a defrosting heating device is switched in until the air refrigerator has reached a predeterminable temperature corresponding to the icefree state; and in that the compressor is then switched on again and also the fan with a time delay relative to the compressor.

23. Method in accordance with claim 22, characterized in that the switching on of the fan takes place when the vaporization temperature ($t_O$) has reached a predeterminable value.

24. Method in accordance with claim 22 characterized in that, in parallel to the monitoring of the difference temperature ($\delta t_1$), a monitoring of the refrigerant throughflow is effected with respect to a reduction of the throughflow which extends over a predeterminable time interval, and in that the switching on of the defrosting heating device takes place in dependence on both criteria.

25. Method in accordance with claim 22, characterized in that the switching on and switching off of the compressor is effected in dependence on the supply air temperature (tL 1) and a room thermostat function is thereby realised.

26. Apparatus for carrying the method in accordance with claim 22 comprising an air refrigerator (XL), an expansion valve (EV) arranged in the refrigerant supply line, temperature sensors for determining the supply air temperature (tL 1), the vaporization temperature ($t_O$) of the refrigerant and the overheating temperature ($t_{oh}$) at the and of the air refrigerator, and also a computing unit for forming the setting values for the expansion valve, characterized in that a further temperature sensor is provided for the determination of the heating switch off temperature ($T_{STB}$) corresponding to an icefree state of the air refrigerator (KL) and is connected with the computing unit (KLR); in that signal values corresponding to the degree of opening or to an angle of opening of the expansion value (EV) form evaluatable parameters for the refrigerant throughflow in the computing unit (KLR); and in that the switching on and switching off of the air refrigerator (KL) and also of the fan are controlled via the computing unit (KLR).

27. Apparatus in accordance with claim 26, characterized in that a needle valve or ball valve controlled by a stepping motor is used as the expansion valve (EV); and in that the respective degree of opening of the expansion valve (EV) can be detected in the computing unit (KLR) by step counting procedures.

28. Apparatus in accordance with claim 26, characterized in that the comparison time interval for the change of the refrigerant throughflow can be set in the computing unit (KLR).

29. Apparatus in accordance with claim 26 characterized in that, for the provision of a room thermostat function, the signal delivered from the sensor for the supply air temperature (tL 1) is compared in the computing unit (KLR) with a predeterminable desired value and a switching signal for the compressor control is generated in dependence on the exceeding or falling short of a tolerance range related to this desired value.

30. Apparatus in accordance with claim 29, characterized in that the tolerance range associated with the desired value is adjustable.

31. Method of claim 22 wherein said factor is about equal to 0.625.

* * * * *